United States Patent [19]
Cooper

[11] Patent Number: 5,823,270
[45] Date of Patent: Oct. 20, 1998

[54] STEERABLE IMPLEMENT HITCH

[75] Inventor: David E. Cooper, Washington, Ill.

[73] Assignee: Catepillar Inc., Peoria, Ill.

[21] Appl. No.: 756,303

[22] Filed: Nov. 25, 1996

[51] Int. Cl.$^6$ .................................................. A01B 69/06
[52] U.S. Cl. .............................................................. 172/439
[58] Field of Search ........................................ 172/439, 26

[56] References Cited

U.S. PATENT DOCUMENTS

| | | | |
|---|---|---|---|
| 2,771,306 | 11/1956 | Ash | 280/456 |
| 3,659,733 | 5/1972 | Sinclair et al. | 214/730 |
| 3,791,543 | 2/1974 | Peltonen | 214/730 |
| 4,184,551 | 1/1980 | Orthman | 172/26 |
| 4,463,811 | 8/1984 | Winter | 172/26 |
| 4,640,365 | 2/1987 | Schmidt | 172/26 |
| 4,944,649 | 7/1990 | Stralow | 414/686 |
| 5,082,065 | 1/1992 | Fletcher | 172/273 |
| 5,257,797 | 11/1993 | Johnson | 280/477 |
| 5,647,441 | 7/1997 | Gibbons | 172/439 |

FOREIGN PATENT DOCUMENTS 1037884  8/1966  United Kingdom .

Primary Examiner—Michael J. Carone
Assistant Examiner—Christopher J. Novosad
Attorney, Agent, or Firm—William B. Heming

[57] ABSTRACT

A hitch for a machine such as an agricultural tractor permits controlled towing of an implement behind the machine. The hitch has a frame attached to the machine and a subframe mounted to the frame for movement about a first or pivot axis with respect thereto. A mast is attached to the subframe so that it may pivot relative to the subframe about a second or pitch axis perpendicular to the pivot axis. The mast has a hitch element and a carrier positioned in movable engagement one with the other to permit relative elevational movement of the hitch element. The hitch incorporates multiple degrees of movement in a compact package and is useful as a steerable component of the machine to provide positive steering force.

8 Claims, 2 Drawing Sheets

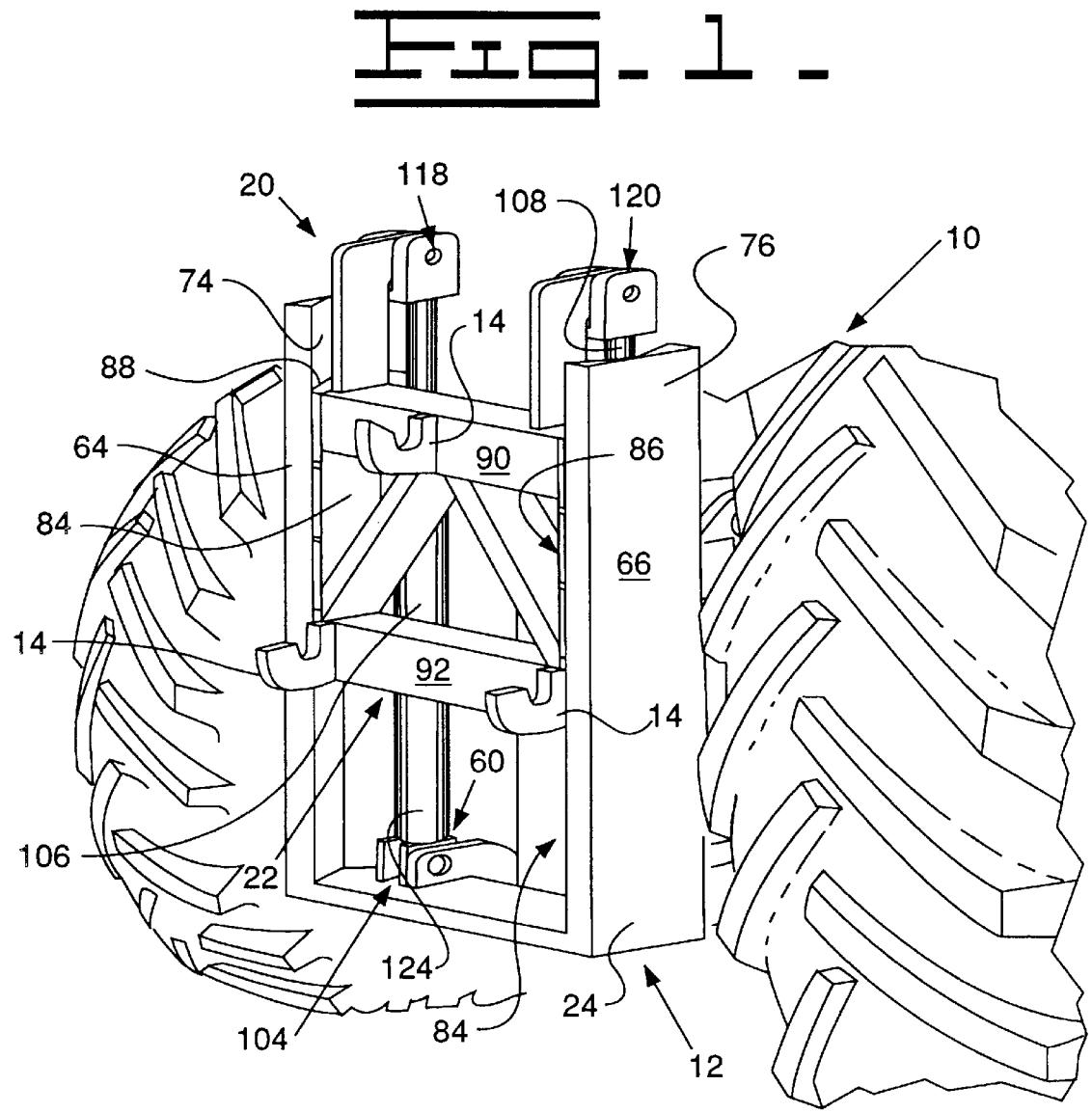

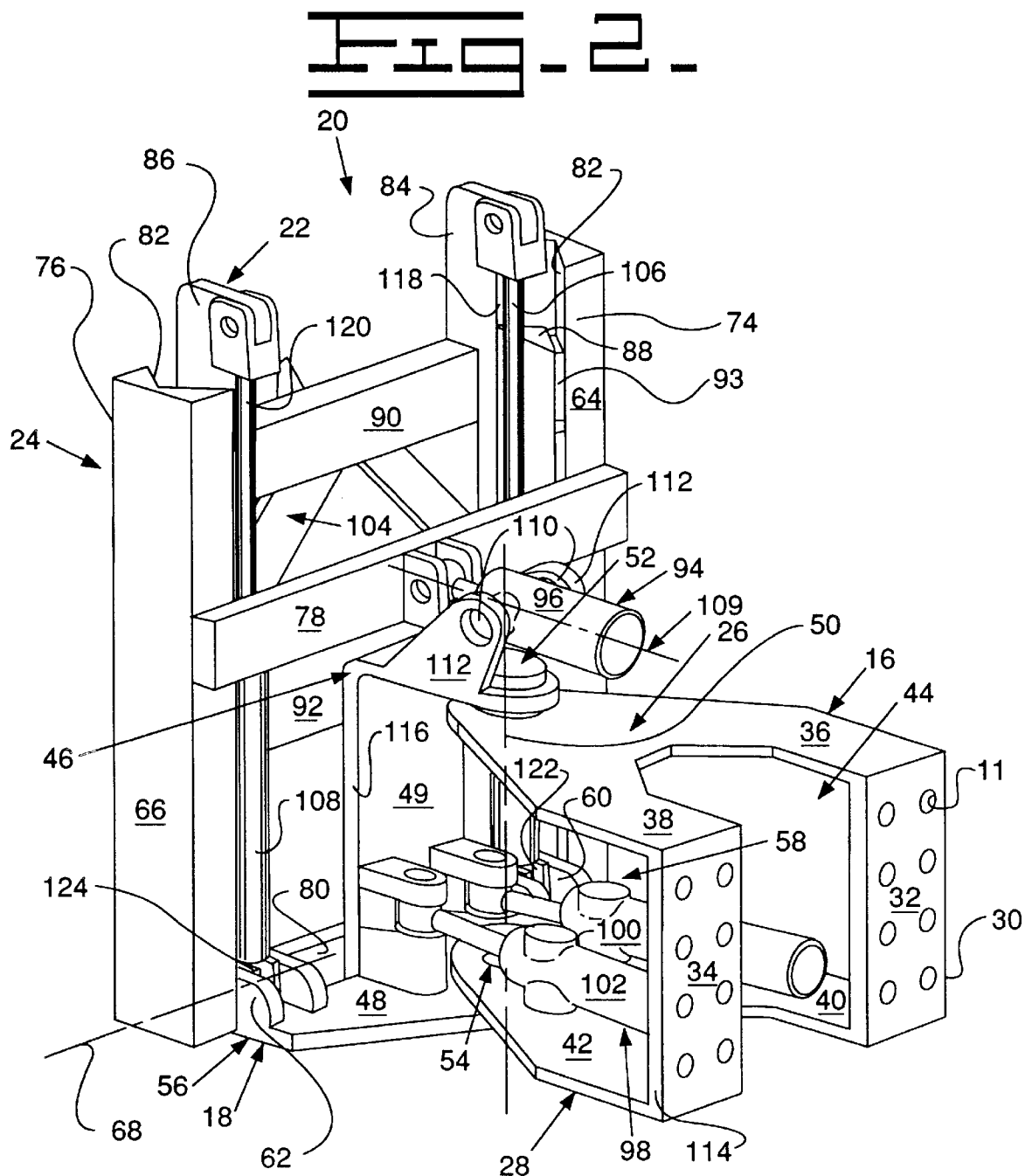

STEERABLE IMPLEMENT HITCH

TECHNICAL FIELD

The present invention relates to hitches for towing implements behind work machines, and more particularly to hitches controllable to steer, pitch and elevate an implement.

BACKGROUND ART

Agricultural tractors and other work machines are commonly used to tow implements behind them for various purposes, including planting, plowing and leveling. It is very important to control the implement so that turning and other desired operations can be readily accomplished. Hitches are commonly incorporated on the back of a tractor to provide a point of attachment for the implement to the tractor. Such hitches have been designed to provide some movement of the implement relative to the tractor through hydraulic or other control mechanisms controlled by the tractor operator. For example, U.S. Pat. No. 4,640,365 issued Feb. 3, 1987, to Schmidt shows a row guidance device for steering an implement left or right and constructed so as to separately accommodate raising and lowering of the implement. U.S. Pat. No. 5,257,797 issued Nov. 2, 1993, to Johnson discloses a tractor hitch with a feature to raise and lower a draw bar through which an implement can be attached to the hitch.

The hitches previously known, however, have not readily provided full flexibility to control a hitch through multiple degrees of movement. For example, it is not only desirable to "steer" an implement left or right behind a tractor (to provide positive steering force), but to also be able to pitch the implement or elevate it relative to the tractor. These additional freedoms of movement can be used to control the implement in a variety of conditions, such as wet soil, or to accommodate different tractor configurations, such as differences in available counterweights. The present invention is directed to overcoming one or more of the problems as set forth above.

Disclosure of the Invention

In one aspect of the invention, an implement hitch for a machine has a frame and a sub-frame mounted to the frame in a manner sufficient for pivotal movement about a first axis relative to the frame. A mast has a carrier and a hitch element. The carrier is mounted to the sub-frame for pivotal movement about a second axis relative to the sub-frame, with the second axis being perpendicular to said first axis. The hitch element is moveable relative to said carrier. Hydraulic cylinders or other control means are provided between the frame and sub-frame, the sub-frame and carrier, and the carrier and hitch element. The sub-frame pivotally moves about the first axis in response to operation of a pivot hydraulic cylinder. The carrier pivotally moves about the second axis in response to operation of a tilt hydraulic cylinder, and the hitch element moves in a plane passing through the second axis in response to operation of a lift hydraulic cylinder.

In another aspect of the present invention, the implement hitch has a frame and a sub-frame pivotally mounted to the frame. A mast has a carrier and a hitch element, with the carrier being pivotally mounted to the sub-frame. The hitch element is positioned in moveable engagement with the carrier and moveable relative to the carrier. Pivot means is provided for controllably, pivotally moving the sub-frame about a first axis relative to the frame. Pitch means is provided for controllably, pivotally moving the carrier about a second axis to the sub-frame, which second axis is perpendicular to the first axis. Further, lift means is provided for controllably moving the hitch element relative to the carrier in a plane containing said second axis.

In preferred embodiments of the present invention, a single pitch hydraulic cylinder pivotally moves the carrier relative to the sub-frame. The pitch cylinder has a longitudinal axis generally perpendicular to and intersecting the first axis. Further, a second pivot hydraulic cylinder is included, with the pivot hydraulic cylinders being positioned on opposite sides of the first axis.

BRIEF DESCRIPTION OF THE DRAWINGS

FIG. 1 is a view in perspective of the implement hitch of the present invention connected to the rear portion of a work machine; and FIG. 2 is a view in perspective of the opposite side from FIG. 1 of the implement hitch of the present invention, but detached from the work machine.

BEST MODE FOR CARRYING OUT THE INVENTION

Referring to FIG. 1, a work machine 10 such as an agricultural tractor is shown having an implement hitch 12. The implement hitch 12 is used to pull an implement (not shown) such as a plow, planter or other device. The implement may be connected to the hitch 12 at locations provided thereon, such as the three points or hooks 14 shown in the drawing.

Referring more particularly to FIG. 2, the implement hitch 12 has a frame 16 which is connected to the work machine 10, typically with bolts or the like (not shown) such as through the openings 11 for ease of removal of the hitch 12 from the machine 10. The hitch 12 also has a sub-frame 18 and a mast 20 which includes a hitch element 22 carrying the hooks 14 and a carrier 24. The hitch element 22 is that portion of the hitch 12 to which an implement is connected to be pulled behind the machine 10.

The hitch frame 16 has top and bottom portions 26,28 and a connection plate 30. The connection plate 30 extends between and connects the top and bottom portions 26,28 and is the part of the frame 16 used to connect the hitch 12 to the machine 10 at a suitable location on the machine 10, usually also the frame of the machine 10. The connection plate 30 as shown is divided into first and second parts 32,34. The frame top and bottom portions 26, 28 are generally "U" shaped with each having separate legs 36,38 and 40,42. Each part 32,34 of the connection plate 30 joins respective ones of the legs 36,40 and 38,42 of the top and bottom portions 26,28. This arrangement provides an opening 44 through which a power take off, hydraulic lines or the like may pass from the machine 10 to the implement and/or the hitch 12.

The sub-frame 18 also has top and bottom portions 46,48 interconnected by a middle portion 49 and is so located as to extend between the top and bottom portions 26,28 of the frame 16. The sub-frame 18 is mounted to the frame 16 in a manner sufficient for pivotal movement about a first or pivot axis 50 and relative to the frame 16. As can be appreciated, this relative pivotal movement is accommodated by spaced apart, first and second pivotal connections 52,54 between the top portions 26,46 of the frame 16 and sub-frame 18 and between their bottom portions 28,48, respectively. The construction of the pivotal connections 52,54 and their location on the first axis 50 permits the relative movement, generally referred to herein as left or right pivotal movement of the implement.

The mast 20 is mounted or pivotally connected to the sub-frame 18 in a manner sufficient for relative motion between the two. In the embodiment shown, the sub-frame 18 has first and second sides 56,58 which are connected through pivotal connections 60,62 with first and second sides 64,66 of the carrier, respectively, to accommodate the movement. The relative pivotal movement between the carrier 24 and sub-frame 18 is about a second or pitch axis 68 which is perpendicular to (but as shown does not intersect) the first or pivot axis 50.

The construction of the mast 20 is such as to accommodate generally elevational movement (viewed from the perspective of the ground) of the hitch element 22 relative to the carrier 24. As shown, the hitch element 22 is in engagement with or constrained by the carrier 24 to locate its position but permit it to be moveable. The movement of the hitch element 22 is perpendicular to the pitch axis 68 in a plane which is defined by the upright mast configuration and contains all points of the pitch axis 68. The embodiment of the carrier 24 shown includes first and second uprights or longitudinal channel portions 74,76 and top and bottom cross members 78,80 which extend between and fix the uprights 74,76 one relative to the other in a parallel arrangement. The inwardly facing surfaces 82 of the uprights 74,76 are shown of a generally "V" shaped configuration (cross-section) for purposes discussed below.

The hitch element 22 has first and second arms 84,86 spaced apart in a parallel arrangement and with outwardly facing surfaces 88 also of generally "V" shaped configuration complementary with the inwardly facing surfaces 82 of the uprights 74,76. The arms 84,86 are fixed in their positions by an upper cross member 90 and a lower cross member 92 which extend between the arms 84,86 and are attached thereto by suitable connections such as a weld, bolts or the like. These cross members 90,92 can also be suitably positioned to be used to carry the hooks 14 for attaching the implement. The arms 84,86 are spaced at appropriate distances and orientation so that their "V" shaped, outwardly facing surfaces 88 will fit or mate in the complementary, inwardly facing surfaces 82 of the uprights 74,76. This fit will be appropriate for permitting constrained movement of the hitch element 22 relative to the carrier 24 on bearings 93 positioned between the mating channel portions 74,76 and arms 84,86.

The movement of the implement hitch 12 is controlled by means for moving the various hitch components, which include hydraulic cylinders appropriately positioned on the hitch 12. In the embodiment shown, pitch means 94 includes a single pitch cylinder 96 for controllably, pivotally moving the mast 20 about the pitch axis 68 in response to operation of said cylinder 96. Pivot means 98 includes first (right) and second (left) pivot cylinders 100,102 for controllably, pivotally moving the sub-frame 18 about the first axis 50 in response to operation of the pivot cylinders 100,102. Lift means 104 includes first and second lift cylinders 106,108 for controllably moving the hitch element 22 in response to operation of the lift cylinders 106,108.

As shown, opposite ends of each of the cylinders are connected to the appropriate components of the hitch 12 generally through connections which permit some pivotal movement. The pitch cylinder 96 is connected at its ends between the sub-frame 18 and carrier 24 and is located above the top portions 26,46 of the frame 16 and the sub-frame 18 spaced from the second or pitch axis 68. The pitch cylinder 96 is connected through pivotal connections 110 at opposing lobes 112 on the top portion 46 of the sub-frame 18 and at another pivotal connection to the top cross member 78. The pitch cylinder has a longitudinal axis 109 which passes through the pivot axis 50. This axis 50 is intended to be generally perpendicular to the first axis 50, at least when the mast 20 is upright, although it can be seen that, through operation of the hitch 12, the orientation of the two axes 109,50 will change. This change is accommodated through the pivotal connections 110 and the connection of the pitch cylinder 96 to the carrier 24.

The pivot cylinders 100,102 are connected at their ends between the frame 16 and sub-frame 18. Those cylinders 100,102 are also located between the frame top and bottom portions 26,28 and also the sub-frame top and bottom portions 46,48. Owing to the design of the hitch 12, the cylinders 100,102 are also be located within an envelope defined by the side edges 114,116 of the frame 16 and sub-frame 18 and the connection plate 30 and middle portion 49 of the sub-frame 18.

The lift cylinders 106,108 are connected at their ends between the carrier 24 and hitch element 22. In a preferred embodiment, first ends 118,120 of the lift cylinders 106,108 are pivotally connected to the hitch element 22 at two spaced apart locations which are located, respectively, on the first and second arms 84,86 on opposite sides of the first axis 50. Second ends 122,124 are each pivotally connected at a respective one of the pivotal connection points 60,62 between the sub-frame 18 and the carrier 24 and outboard of the pivot cylinders 100,102.

The cylinders shown are all of conventional construction and are actuated by controls and through use of a pressurized hydraulic fluid source connected to the cylinders which are typically carried on the machine (not shown). As the construction and control of such cylinders are well known, their operation will not be discussed. It is also contemplated that any other suitable substitutes for the cylinders may be used to control the implement hitch 12.

Industrial Applicability

The disclosed implement hitch 12 provides a very compact and multi-functional device for controlling implements to be towed behind the work machine 10, which can be constructed so as to be readily attachable to most machines. The arrangement of the various components comprising the hitch 12 contribute to the compact design while retaining the desired degrees of movement. For example, the construction of the frame 16 and sub-frame 18 permits the pivot cylinders 100,102 to be placed "inside" the frame 16 and sub-frame 18 to save space and protect the cylinders 100,102. It also permits the width of the mast 20 to be selected according to need and not be overly influenced by location of the pivot cylinders 100,102, which are located relatively close together while still providing pivotal movement.

Additionally, the movement about multiple axes 50,68 and elevationally through the mast make the hitch 12 very versatile. For example, the hitch 12 can be used to reduce the downforce on the front of a machine reducing the need for counterweights on the front of the machine. The hitch 12 is also, in effect, a readily controllable steerable component on the machine 10. Through actuation of the hydraulic cylinders, particularly those 96,98 controlling movement about the pivot axis 50, the hitch 12 can be used to provide a positive steering force to assist during turns of a tractor with the implement in the soil. These features make the hitch 12 especially suitable for agricultural tractors which tow large and heavy implements through adverse soil conditions.

Other aspects, advantages, and objects of the the invention can be obtained from a study of the drawings, the disclosure and appended claims.

I claim:

1. An implement hitch for a machine, comprising:

a frame;

a sub-frame being pivotally mounted to said frame, said sub-frame being pivotally moveable about a first axis relative to said frame;

a mast having a carrier and a hitch element, said carrier being pivotally mounted to said sub-frame, said carrier being pivotally moveable about a second axis relative to said sub-frame, said second axis being perpendicular to said first axis, said hitch element being positioned in moveable engagement with said carrier, said hitch element being moveable relative to said carrier;

at least a first pivot hydraulic cylinder connected between said frame and sub-frame, said sub-frame pivotally moving about said first axis in response to operation of said first pivot hydraulic cylinder;

a pitch hydraulic cylinder connected between said sub-frame and carrier, said carrier pivotally moving about said second axis in response to operation of said pitch hydraulic cylinder; and at least a first lift hydraulic cylinder being connected between said carrier and hitch element, said hitch element moving in response to operation of said first lift hydraulic cylinder.

2. The implement hitch of claim 1 wherein a single pitch hydraulic cylinder pivotally moves said carrier relative to said sub-frame, said cylinder having a longitudinal axis intersecting said first axis.

3. The implement hitch of claim 1 further including a second pivot hydraulic cylinder, said first and second pivot hydraulic cylinders being positioned on opposite sides of said first axis.

4. The implement hitch of claim 1 wherein said carrier is mounted to said sub-frame at two spaced apart pivotal connection points and further including a second lift hydraulic cylinder, said first and second lift hydraulic cylinders each having first and second ends, said first ends being pivotally connected at spaced apart locations to said hitch element, said second ends each being pivotally connected at a respective one of the pivotal connection points between said carrier and sub-frame.

5. The implement hitch of claim 1 wherein said carrier has two longitudinal channel portions of generally "V" shaped cross-section and said hitch element has two arms each of a construction sufficient for mating in moving relation with a respective one of said channel portions and further including bearing elements positioned between each of said channel portions and the mating arms.

6. A implement hitch for a machine, comprising:

a frame having top and bottom portions spaced one from the other and a machine connection plate connecting said top and bottom portions;

a sub-frame extending between said top and bottom portions of said frame and having a top portion and a bottom portion, said sub-frame top and bottom portions having pivotal connections to said frame top and bottom portions, respectively, said sub-frame being pivotally movable relative to said frame about a first axis, said sub-frame bottom portion having first and second sides;

a mast having a carrier and a hitch element, said carrier having first and second sides and a pivotal connection at said first and second sides to said first and second sides of said sub-frame bottom portion, respectively, said carrier being pivotally moveable relative to said sub-frame about a second axis, said second axis being perpendicular to said first axis, said hitch element being positioned in moveable engagement with said carrier, said hitch element being moveable relative to said carrier;

first and second pivot hydraulic cylinders each being pivotally connected to said frame and sub-frame on respective opposite sides of the first axis, said sub-frame pivotally moving about said first axis in response to operation of said pivot hydraulic cylinders;

a single pitch hydraulic cylinder having a longitudinal axis and being pivotally connected to said sub-frame top portion and said carrier, said longitudinal axis generally intersecting said first axis, said carrier pivotally moving about said second axis in response to operation of said tilt hydraulic cylinder; and first and second lift hydraulic cylinders each being pivotally connected to said sub-frame and said carrier at a respective one of said pivotal connections of said sub-frame to said carriers and connected to said hitch element, said hitch element moving in response to operation of said lift hydraulic cylinders.

7. The implement hitch of claim 6 wherein said first and second pivot hydraulic cylinders are located between said sub-frame top and bottom portions and said frame top and bottom portions.

8. An implement hitch, comprising:

a frame;

a sub-frame pivotally mounted to said frame and being pivotally moveable about a first axis relative to said frame;

a mast having a carrier and a hitch element, said carrier being pivotally mounted to said sub-frame and pivotally moveable about a second axis relative to said sub-frame, said second axis being perpendicular to said first axis, said hitch element being positioned in moveable engagement with said carrier and moveable relative to said carrier;

pivot means for controllably, pivotally moving said sub-frame about said first axis;

pitch means for controllably, pivotally moving said carrier about said second axis; and lift means for controllably moving said hitch element.

* * * * *